Feb. 17, 1942.  W. F. PENROSE  2,273,065
ELECTROMAGNETICALLY CONTROLLED APPARATUS AND METHOD THEREFOR
Filed Feb. 28, 1940   5 Sheets-Sheet 1

INVENTOR
William F. Penrose
BY
Pennie, Davis, Marvin & Edmonds
ATTORNEYS

Feb. 17, 1942.   W. F. PENROSE   2,273,065
ELECTROMAGNETICALLY CONTROLLED APPARATUS AND METHOD THEREFOR
Filed Feb. 28, 1940   5 Sheets-Sheet 4

INVENTOR
William F. Penrose
BY
Pennie, Davis, Marvin and Edmonds
ATTORNEYS

Patented Feb. 17, 1942

2,273,065

UNITED STATES PATENT OFFICE 2,273,065

ELECTROMAGNETICALLY CONTROLLED APPARATUS AND METHOD THEREFOR

William F. Penrose, Irvington, N. J., assignor to Empire Electric Brake Corporation, a corporation of Delaware Application February 28, 1940, Serial No. 321,169

21 Claims. (Cl. 188—138)

This invention relates generally to an improved method and apparatus for deriving force from the torque of a rotating part by sliding friction controllably maintained electromagnetically between two flat surfaces in continuous flat rubbing contact relation, one of which surfaces is mechanically associated with the rotating part. The invention relates more specifically to an electromagnet and lever combination and to embodiments utilizing the improved method and apparatus in electromagnetically controlled brakes for industrial machinery and for vehicles and vehicle wheels of all kinds including airplane landing wheels.

Among the principal objects of the invention are: First, the provision of an improved method and apparatus for controllably deriving force from the torque of a rotating flat-face-armature by sliding friction with a compact flat-face direct current electromagnet, preferably of the central-core type. By disposing such an electromagnet wholly to one side of the axis of rotation of a flat-face-armature and in flat rubbing contact relation therewith, the frictional force exerted between the electromagnet and the rotating armature when the electromagnet winding is controllably energized from a source of voltage at any given current value up to a maximum, is derived continuously and substantially without variation in value. And by applying the force so derived to a movable working-member non-rigidly associated with the electromagnet, from within the central portion of the electromagnet structure and at a plane closely adjacent that of the rubbing contact between armature and electromagnet, the establishment of unequal pressures on the face of the electromagnet due to moments tending to overturn the electromagnet is substantially avoided and the production of localized high pressure and high temperature areas is greatly minimized. The production of such areas would tend to induce rapid deterioration of the working surfaces and give rise to uneven wear, scoring, grinding, chipping, and the like of either or both of the electromagnet and armature faces. As a result of minimizing or substantially eliminating those undesirable phenomena, operation is smooth, steady, and quiet, and the coefficient of friction at the plane of rubbing contact tends to remain substantially constant for any given value of current being supplied to the electromagnet winding. For many reasons, both mechanical and electrical, it is preferable to make the working face of the electromagnet of softer material than that of the armature face.

Second, the provision of a simple lever and electromagnet combination for effectively utilizing the derived force with mechanical advantage while retaining all of the benefits accruing from the general arrangement and operation described above. To this end a lever of the first class may be pivotally mounted on a non-rotatable support arranged adjacent the rotating armature. The pivot of the lever is preferably disposed to one side of the armature axis at a substantial radial distance therefrom and with the long arm of the lever extending a substantial radial distance beyond the armature axis on the opposite side. At or adjacent the free end of the long arm of the lever there is arranged a compact flat-face central-core electromagnet. Thus the entire structure of the electromagnet is wholly disposed to one side of the armature axis opposite that of the lever pivot. The electromagnet, which is preferably as described in the copending application of Frank C. Stockwell and William F. Penrose, Serial No. 321,168, filed February 28, 1940, is supported wholly by the lever arm from within the central core of the electromagnet and on or about its axis of symmetry at a plane closely adjacent its face and that of the armature in flat rubbing contact relationship. The arrangement, including spring means urging the electromagnet in light flat rubbing contact with the armature, is such as to maintain that relationship while permitting of axial and limited universal pivotal movement of the electromagnet structure and face with respect to the lever arm. In this way, if the armature in rotating tends to oscillate slightly in the axial direction due to end play, or to wobble or otherwise run out of true, the electromagnet face and structure will move in accommodation therewith thus tending to maintain continuously the desired flat rubbing contact relationship between the electromagnet and armature faces at all times.

Third, the provision of a nicely controllable electromagnetically actuated brake wherein the braking action is smooth in operation for either direction of armature rotation and which at the same time is simple, compact, and relatively inexpensive to manufacture, install, and service, and which is operable at such low current values as to impose but a small current demand even at maximum current energization of the electromagnet winding. Thus, for example, the capacity of the ordinary automobile storage battery, in an automobile equipped with my improved brakes, or the usual motorcycle storage battery, in the case of a motorcycle so equipped, is more than ample to take care of the relatively small current demands required for effective braking of those vehicles under all conditions. Such a brake may embody mechanical features described and claimed in my prior Patent No. 1,928,630, granted October 3, 1933.

I am aware of the prior proposals which have been published and the progress which has been made during the past years with respect to the improvement of electrically or electromagnetically actuated brakes and clutches and the like, and I am generally familiar with the patents and publications relating thereto. The development may be conveniently traced by reference first to the early U. S. patents to Sperry No. 554,977 and to Williams No. 817,210.

Among foreign patents and publications reference may be made to Lanser French Patent No. 523,703, published August 24, 1921, and to the corresponding British Specification No. 168,873, and to Lanchester British Patent No. 198,707, the disclosure of which was described in "The Motor" of August 21, 1923. Among later developments and proposals in the United States may be mentioned those of U. S. Patents Nos. 1,837,384, 1,822,554, 1,954,603 and those of the Chambers Patents Nos. 1,958,608, 1,970,951, 1,998,491, and 2,024,847.

I am also familiar with the Warner "electric brake" now on the commercial market, the basic design and mode of operation of which were described in "Automobile Topics" for May 31, 1930.

In accordance with the present invention many of the disadvantages of the prior electric or electromagnetically actuated brakes and proposals for the same are overcome in the novel and improved manners to be described in conjunction with the accompanying drawings, in which—

Fig. 6 is a front view of a brake and brake assembly employing the arrangements of Figs. 1 and 2 in a single shoe self-energizing type particularly adapted for use in brake drums of limited diameter, for example the brake drums at motorcycle wheels and the like;

Figure 1:
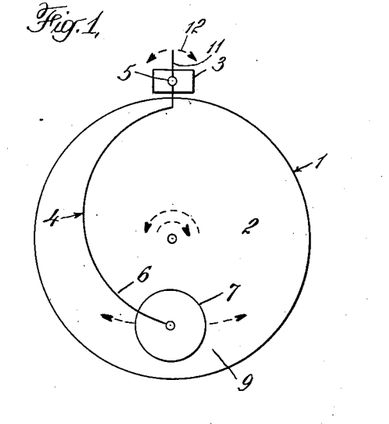
Fig. 1 is a schematic showing of a preferred arrangement of a lever and electromagnet combination wherein the lever pivot and the electromagnet are disposed on opposite sides of the armature axis at substantial radial distances therefrom.
Figure 2:
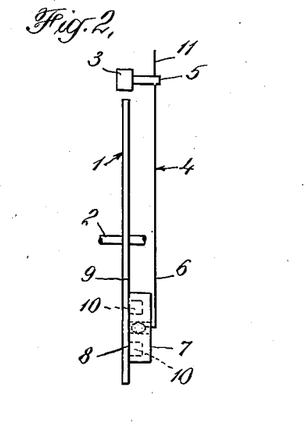
Fig. 2 is a side view of Fig. 1, partly in section, illustrating schematically the manner of non-rigidly mounting the electromagnet on the long arm of the lever so that the force derived is applied to the lever from within the central portion of the electromagnet at a plane closely adjacent that of the rubbing contact between the armature and electromagnet.

Referring now to Figs. 1 and 2, a circular disc-like armature 1, is adapted to be rotated about its axis 2. Adjacent the rotating armature 1, a non-rotatable support 3, is fixedly arranged. Upon the support 3, a lever 4, of the first class is pivoted about the pin 5, fixed in the support 3. The long arm 6, of the lever 4, extends around and beyond the armature axis 2, to a point more than 90° from the pivotal connection 5, of said lever 4 on the support 3. A flat-face central-core electromagnet 7, is arranged at the free end of the long arm 6, and is wholly supported thereon from within the central core of the electromagnet 7, at a plane closely adjacent the face 8, thereof in flat rubbing contact relation with the armature face 9.

It will be observed that the manner of supporting the electromagnet 7 on the lever arm 6 is such as to permit of axial and limited universal pivotal movements of the electromagnet face and structure with respect to the lever arm 6. Thus, if the armature 1 in rotating tends to oscillate slightly in the axial direction or to run out of true, the electromagnet 7 and the flat face thereof 8 in flat rubbing contact relation with the face 9 of the armature 1, will move in accommodation therewith, thus tending to maintain continuously the desired flat rubbing contact relationship between the electromagnet and armature faces.

When the electromagnet winding 10 is controllably energized from a source of voltage (not shown), the resulting frictional force exerted between the electromagnet and armature is applied to the long arm 6, due to the magnetic attraction normal force and the accompanying friction of relative motion between the electromagnet and armature faces. The force so derived from the torque of the rotating armature 1, is available for working application with the mechanical advantage of the lever 4, at the short arm 11, thereof. The operation just described is independent of the direction of rotation of the armature and the lever is free to be actuated by the electromagnet in either direction in an arc 12, whose center is the pivot pin 5, because of the non-linear form of its long arm 6 which extends around and beyond the axis 2 of the armature 1.

For the most effective operation it is preferred that the electromagnet be disposed a substantial radial distance from the axis 2, in flat rubbing contact with the armature 1, and to the side opposite that at which the lever is pivoted. Additional advantage is gained by arranging the lever pivot at a substantial radial distance from tromagnet 51 from a source of voltage as in Fig. 12. A screw clamp 82 on the arm 70 of the lever 57 provides means for holding the lead wires (not shown) in place and preventing strain on the connections to the winding during lever movement.

Figure 6:
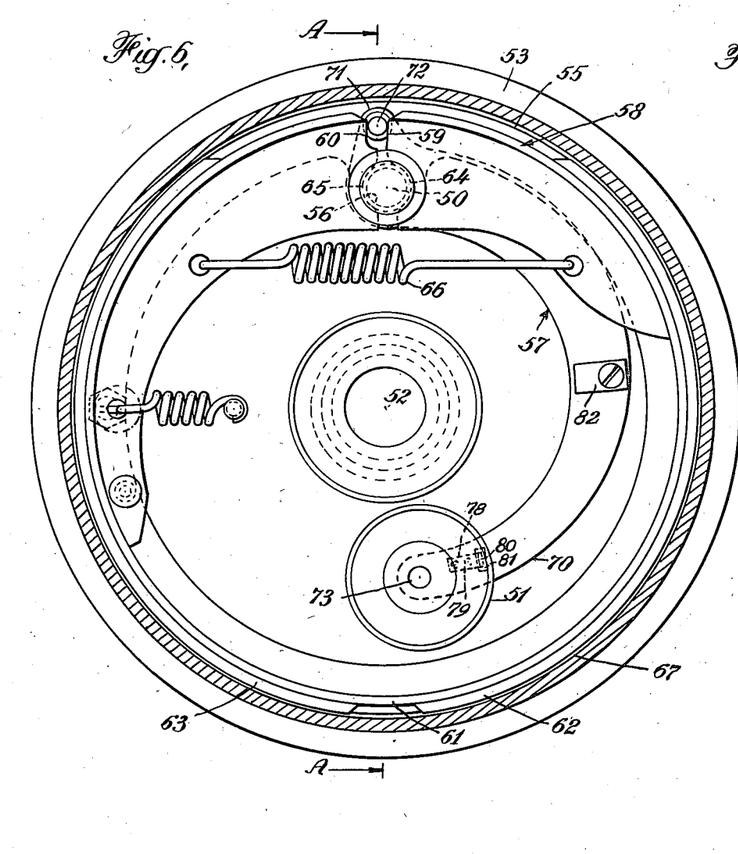
Figure 7:
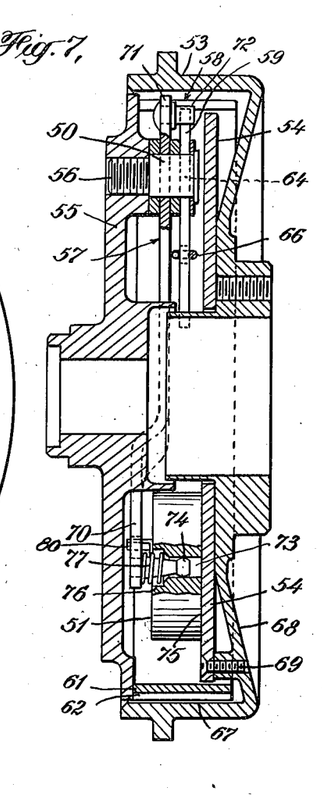
Fig. 7 is a side view in section taken along A—A of Fig. 6.
Figures 9, 12:
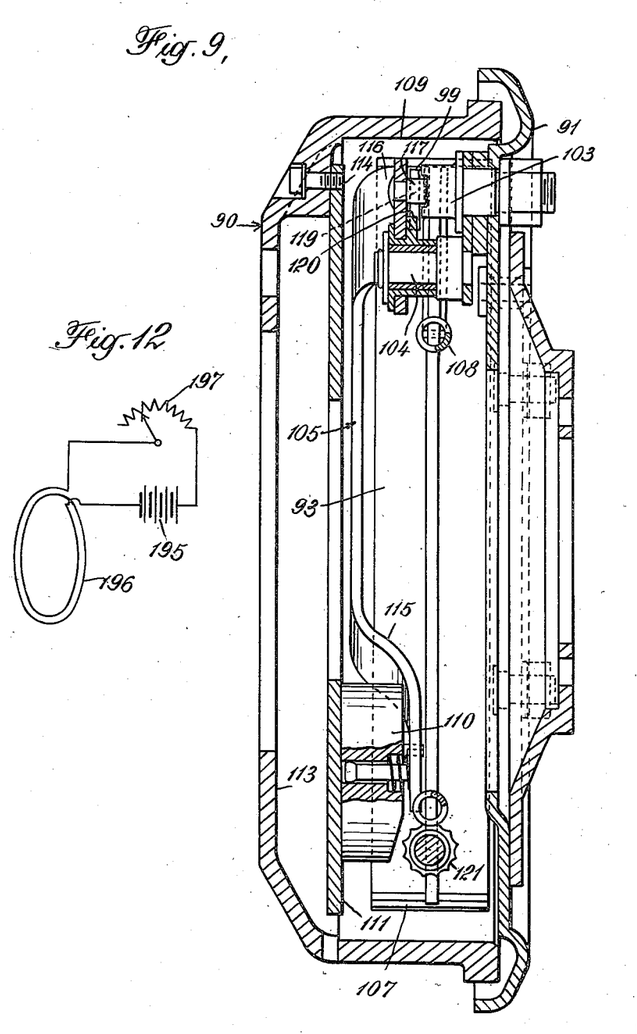
Fig. 9 is a side view in section taken along B—B of Fig. 8.
Fig. 12 is a wiring diagram showing schematically the electric circuit arrangement of the electromagnet winding of any one of the previous figures, with means including a source of direct current voltage for controllably energizing the winding.

It will be understood from the description of the arrangements of Figs. 6 and 7 that the brake shoe 58 and the primary and secondary lining portions 62, 63 will be applied upon controllably energizing the winding of the electromagnet 51 as schematically illustrated in Fig. 12. When the winding is so energized at any given current value up to a maximum, force is derived continuously and substantially without variation in value from the torque of the rotating drum 53 by electromagnetically induced friction between the electromagnet 51 and the rotating armature plate 54. The force so derived is applied with the mechanical advantage of the lever 57 through the lever short arm 71 to actuate one or the other of the separable operating ends 59, 60 of the brake shoe 58 depending upon the direction of armature rotation, to apply the brake. It is to be noted that by reason of the electromagnet 51-lever 57 combination, with the electromagnet 51 disposed at the opposite side of the axis 52 from that of the lever pivot 50 and the point of application of the braking force, that operating end of the brake shoe 58 which is the leading end will be moved by the lever in the same direction as the direction of rotation of the drum, while the other operating end of the brake shoe will be firmly seated and anchored against the anchor pin 56, all in a manner similar to that described in my prior Patent 1,923,630. My improved electromagnetically actuated brake of the present invention is in at least one embodiment thereof of the self-energizing type and its operation is fully reversible, depending solely upon the direction of rotation of the armature plate 54.

Figure 8:
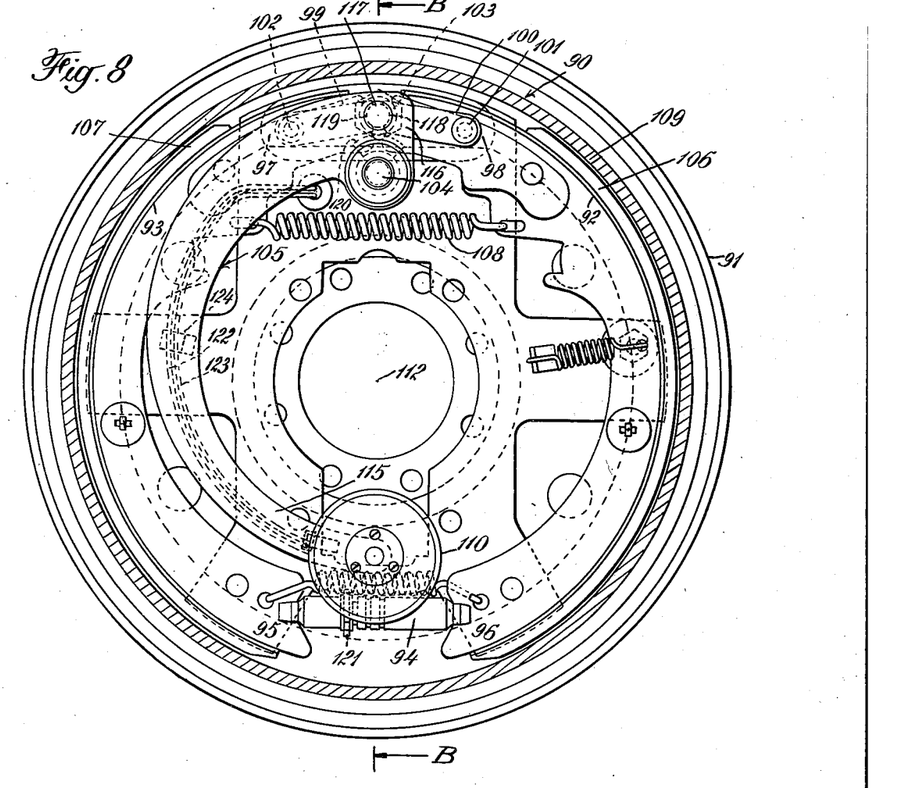
Fig. 8 is a front view of a brake and brake assembly of the two shoe single anchor self-energizing articulated type embodying features of the present invention as applied to intermediate brake drums of the order of those useful at automobile and light truck wheels.
Figure 8A:
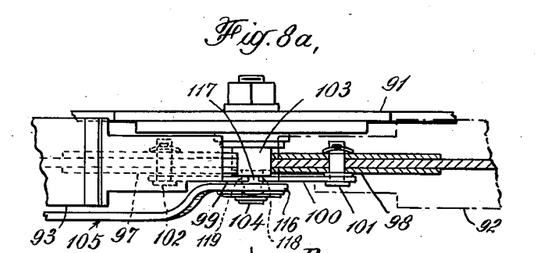
Fig. 8a is a top view of a portion of Fig. 8 showing the arrangement of the link members actuating the operating ends of the brake shoes.

In Figs. 8, 8a, and 9 the brake drum 90 forms part of the rotating wheel and the non-rotatable support or backing plate 91 is affixed upon the axle in a conventional manner. The various adjacent parts of the wheel and axle are not shown as they form no part of the present invention.

The two brake shoes 92, 93 are articulated with the adjusting member 94 at the ends 95, 96 thereof. The oppositely disposed operating ends 97, 98 of the brake shoes 92, 93 are adapted to be selectively actuated through links 99, 100 pivotally connected to the brake shoes 92, 93 by pins 101, 102. In retracted position the brake shoes 92, 93 engage the adjustable anchor pin 103 carried by the backing plate 91, which pin serves as a hanger for the brake shoes. The lever pivot pin 104 is also supported from and movable with the anchor pin 103. The lever 105 is pivoted about the pin 104.

Brake lining portions 106, 107 are affixed to the outer surfaces of the brake shoes 92, 93. A coil spring member 108 provides tension between the operating ends of the brake shoes 92, 93 to hold the brake in the retracted position shown in Fig. 8.

The actuating means for controllably applying the brake shoes 92, 93 in braking engagement with the flange portion 109 of the drum 90 comprises the electromagnet 110-lever 105 combination pivoted at the pin 104, and the disc-like flat-face armature plate 111 with its face perpendicular the drum axis 112, affixed to the web 113 at several spaced points as at 114.

The lever 105 swings about the pivot pin 104 and comprises a relatively long arm 115 extending curvedly and offset to pass around the axis 112 to the electromagnet 110 disposed at a point substantially more than 90° from the pivot pin 104, and a short arm 116 carrying pin 117 which extends between the ends of the links 99, 100. The ends of the links 99, 100 are shaped as at 118, 119 to closely abut each half circumference of the pin 117 when the brake shoes 92, 93 are in the retracted position.

The pin 117 depending upon the direction of movement of the lever 105, selectively actuates one or the other of the operating ends 97, 98 of the brake shoes 92, 93 through the then operating link. Assuming one direction of armature rotation, the energized electromagnet will be moved to the left in Fig. 8. In this event the pin 117 will move to the right, actuating operating end 98 of brake shoe 92 through the link 100. In so operating the pin 117 will move out of abutment with the link 99. During such movement the end of the link 99 will be supported on the curved surface member 120 so that when pin 117 returns to its normal brake retracted position, the shaped ends 118, 119 of the links will again closely engage each half circumference of the pin 117. During movement of the pin 117 in the opposite direction link 99 will actuate operating end 97 of the brake shoe 93 through the link 99, while link 100 will be supported on the curved surface member 120.

The advantage of the brake of Figs. 8, 8a, and 9 over that of Figs. 6 and 7 resides principally in the provision for the adjustment of the brake shoes within the drum 99 with respect to the flange 109, both at the adjustable anchor 103 carried by the support or backing plate 91 and at 121 of the adjustable member 94.

The electromagnet 110 is similar to that described in connection with Figs. 6 and 7 and is supported on the lever arm 115 in the manner described more specifically with reference to Fig. 6 so as to permit of axial and limited universal pivotal movement with respect to the lever arm 105. Like the operation described in connection with Figs. 6 and 7, the brake shoes 92, 93 will be applied upon controllably energizing the winding of the electromagnet 110 as schematically illustrated in Fig. 12. Leads 122, 123 arranged along the lever arm 115 and held in place by the clamp 124 provide electrical connections to the winding of the electromagnet 110.

Figure 10:
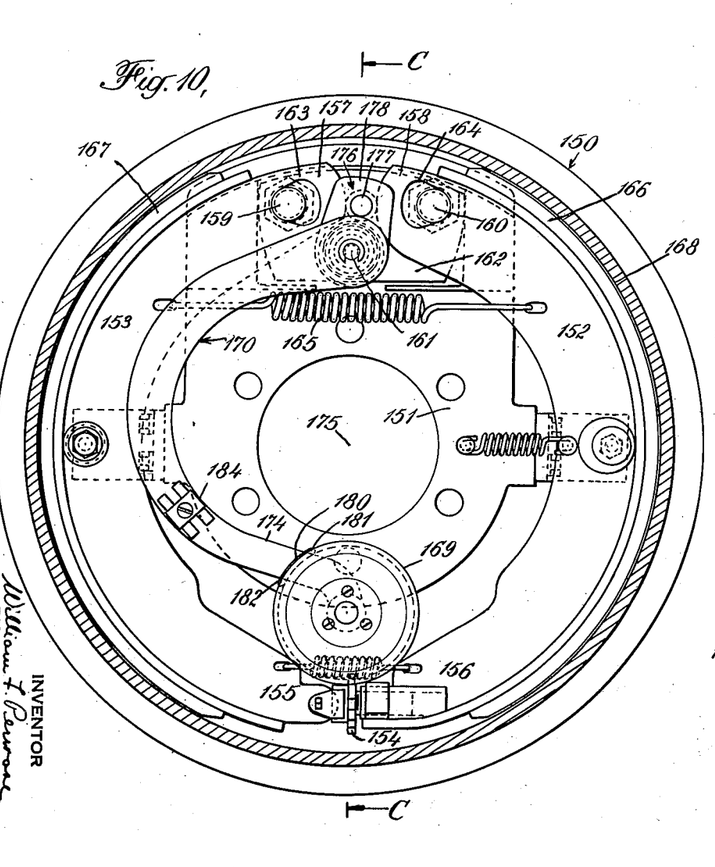
Fig. 10 is a front view of a brake and brake assembly of the two shoe double anchor articulated type embodying features of the present invention as applied to heavy duty brake drums of the order of those useful at heavy truck and trailer wheels.
Figure 11:
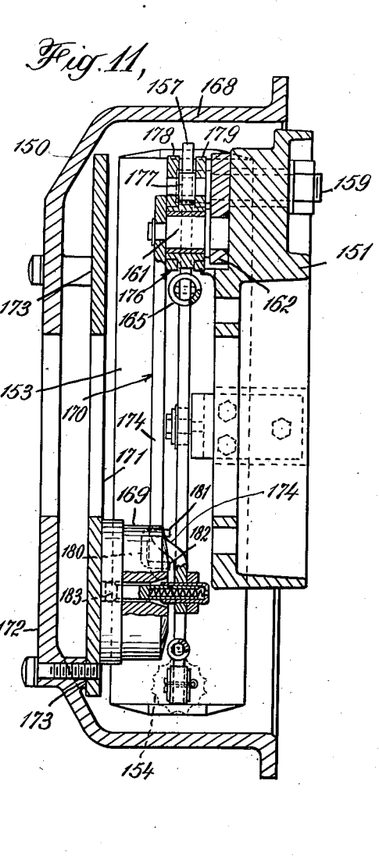
Fig. 11 is a side view in section taken along C—C of Fig. 10.

In Figs. 10 and 11 the brake drum 150 forms part of the rotating wheel and the non-rotatable support 151 is fixed upon the axle in a conventional manner. The various adjacent parts of the wheel and axle are not shown as they form no part of the present invention.

The two brake shoes 152, 153 are articulated with the adjusting member 154 at the ends 155, 156 thereof. The oppositely disposed operating ends 157, 158 of the brake shoes 152, 153 are adapted to be anchored respectively by adjustable anchor pins 159, 160 carried by the support 151. The anchor pins 159, 160 and the lever pivot pin 161 are arranged in fixedly spaced relation on a common plate member 162. Thus, when the anchor pins 159, 160 are in adjusted position on the support 151, the lever pivot pin is supported on the member 162 in fixed relation with the support 151.

the axis 2. When these two conditions obtain, more advantageous lever arm ratios are secured, thus mechanically enhancing the force available at the short arm of the lever.

Figures 3, 4, 5:
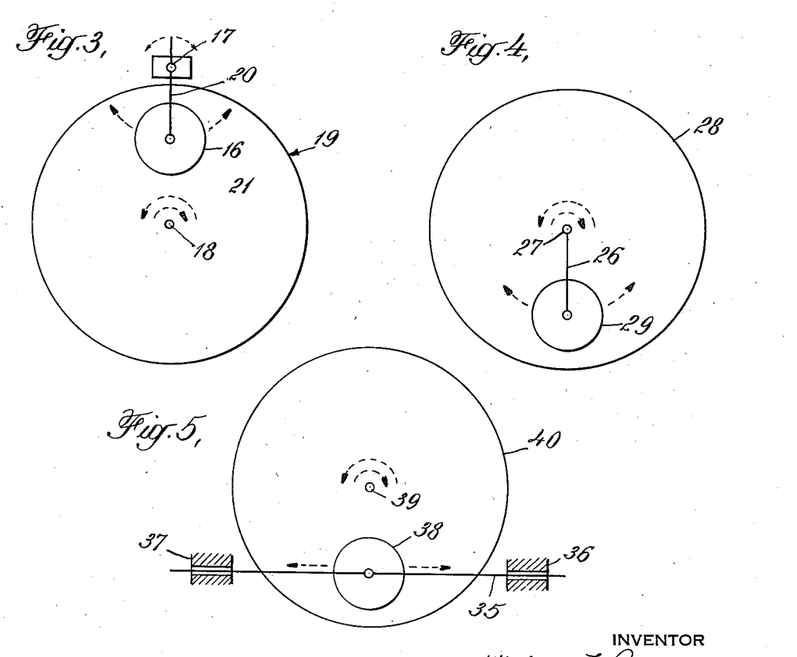
Fig. 3 schematically illustrates an alternative arrangement wherein both the electromagnet and the lever pivot are disposed at the same side of the armature axis.
Fig. 4 schematically shows a modification wherein the lever is pivoted at the armature axis.
Fig. 5 illustrates a further modification wherein the working member upon which the electromagnet is non-rigidly mounted is arranged for simple translatory movement, as distinguished from rotation about a pivot as in Figs. 1 to 4 inclusive.

In Fig. 3 the electromagnet 16, and the lever pivot 17, are disposed on the same side of the axis 18, about which the disc-like armature 19, is adapted to rotate. The electromagnet 16, is wholly supported upon the lever arm 20, with its face in flat rubbing contact relation with the armature face 21, in the manner illustrated in Fig. 2. Thus, like the arrangement of Figs. 1 and 2, the electromagnet 16, and its face may perform axial and limited universal pivotal movements with respect to the lever arm 20, to accommodate irregularities of movement of the armature face 21 during rotation thereof.

In Fig. 4, the lever 26, is pivoted at the axis 27, about which the disc-like armature 28, is adapted to rotate. The electromagnet 29, is wholly supported by the lever arm 26, from within the central core thereof in the manner shown in Fig. 2. In the arrangement of Fig. 4, the lever 26, is of the second class, since the lever pivot 27, is opposite the point of application of the force derived with the electromagnet 29, from the torque of rotation of the armature 28. In application the working force may be applied from the lever at any point between the pivot 27, and the end of the lever arm 26.

The arrangement of Fig. 5 differs from those of Figs. 1 to 4 inclusive, in that the working member 35, is adapted to be moved in a simple translatory manner, viz. to slide back and forth between the fixed supports 36 and 37. The electromagnet 38, disposed at a substantial radial distance from the axis 39, of the disc-like armature 40, is wholly supported on the movable working member 35, from within the central core of the electromagnet 38, in the manner illustrated in Fig. 2. When the winding of the electromagnet 38, is controllably energized from a source of voltage, the force derived from the torque of rotation of the armature 40, may be made available for working application at any point along the member 35. As will be observed, the electromagnet 38, will tend to be displaced in one direction or the other along the path of movement of the working member 35, depending upon the direction of rotation of the armature 40.

In the brake shown in Figs. 6 and 7, like the arrangements of Figs. 1 and 2, the lever pivot pin 50 and the iron-clad central-core flat-face direct current electromagnet 51 are disposed on opposite sides of the axis 52 about which the brake drum 53 and the armature plate 54 rotate. The brake drum 53 forms part of the rotating wheel while the non-rotatable support or backing plate 55 is fixed upon the axle in a conventional manner. The various adjacent parts of the wheel and the axle are not shown as they form no part of the present invention.

The anchor pin 56 and the pivot pin 50 of the lever 57 are integral and are fixed on the backing plate 55. A brake shoe 58 of the single band type having separable operating ends 59 and 60, which include upright reinforcing members extending oppositely for a portion of the circumference of the band member 61, is arranged within the brake drum 53. In retracted position the ends 59, 60 engage the anchor pin 56 which serves as a hanger therefor. Brake lining is affixed to the outer surface of the band member 61 to provide primary and secondary portions 62, 63.

The separable operating ends 59 and 60 are shaped as at 64 and 65 respectively to permit of retraction about the anchor pin 56 and to assist in retaining the brake shoe 58 in proper relation axially the drum. A coiled spring member 66 provides tension between the operating ends of the brake shoe 58 for holding the brake in retracted position as shown in Fig. 6.

The actuating means for controllably applying the brake shoe in braking engagement with the flange portion 67 of the drum 53 comprises the electromagnet 51-lever 57 combination pivoted at the anchor on the pivot pin 50 and the disc-like flat-face armature plate 54 with its face perpendicular to the axis 52, affixed to the web 68 at several spaced points as at 69. The lever 57 swings about the fixed pivot 50 and comprises a relatively long arm 70 extending curvedly and offset to pass around the axis 52 to the electromagnet 51 disposed at a point substantially more than 90° from the pivot pin 50, and a short arm 71 carrying pin 72 which extends between the separable operating ends 59 and 60 of the brake shoe 58. The pin 72 fixed adjacent the free end of the short arm 71 of the lever 57 is arranged with its axis parallel to the axis of the lever pivot 50 but is slightly offset laterally from that vertical plane which includes the drum and lever pivot axes. In this way, changes in the effective length of the short arm of the lever are minimized during lever movement, as the pin 72 engages either one of the separable operating ends 59 and 60 of the brake shoe 58.

The electromagnet 51 is provided with a circular opening 73 extending axially of the central core to permit of support thereof from within the electromagnet structure. A pin 74 fixedly arranged adjacent the free end of the long arm 70 of the lever 57 and having a ball-like terminus extends within the opening 73 to a plane closely adjacent the face 75 of the electromagnet 51. The opening 73 is provided with an enlarged or countersunk portion 76 to permit of limited universal pivotal movement of the electromagnet 51 with respect to the lever arm 70. This countersunk portion provides a shoulder against which the coiled spring 77 reacts axially to urge the electromagnet in normal light rubbing contact relation with the rotating armature plate 54.

The electromagnet 51 is thus wholly supported on the lever arm 70 from within the central core thereof at a plane closely adjacent the face thereof and in a manner to permit of both axial and limited universal pivotal movement. In this way the production of moments tending to overturn the electromagnet 51 in energized flat rubbing contact relation with the rotating armature plate 54 are substantially avoided during operation with the result that the tendency to establish localized high pressure and high temperature areas on the face 75 of the electromagnet 51 is greatly minimized.

To prevent substantial rotation of the electromagnet on and with respect to the lever arm 70, a member 78 having two arms 79, 80 disposed at right angles, is affixed to the back of the casing of the electromagnet 51 along the arm 79. The lever arm 70 is provided with a rectangular slot 81 into which the arm 80 projects. The respective dimensions of the slot 81 and the arm 80 are such as to permit of free movement of the electromagnet 51 on the pin 74 both axially and in a limited universal pivotal manner while restraining substantial rotation thereof.

Electrical connections and lead wires not shown supply current to the winding of the elec- The operating ends 157, 158 of the brake shoes 152, 153 are provided with shaped apertures as at 163, 164 more clearly shown in Fig. 10 and into which the anchor pins 159, 160 extend. The size and shape of the apertures 163, 164 are such as to permit of the movement required of the brake shoes during brake application and to abut the anchor pins when the brake shoes are in the retracted position under tension of the coil spring 165 as shown in Fig. 10. Brake lining 166, 167 is affixed to the outer surfaces of the brake shoes 152, 153.

The actuating means for controllably applying the brake shoes 152, 153 in braking engagement with the flange portion 168 of the brake drum 150 comprises the electromagnet 169-lever 170 combination pivoted at the pin 161, and the disc-like flat-face armature plate 171 affixed to the web 172 at several spaced points as at 173.

The lever swings about the pivot pin 161 and comprises a relatively long arm 174 extending curvedly and offset to pass around the axis 175 to the electromagnet 169 disposed at a point substantially more than 90° from the pivot pin 161, and a short arm 176 carrying a pin and roller 177 which extends between the operating ends 157, 158 of the brake shoes 152, 153. The short arm 176 includes the spaced members 178, 179 supporting the pin and roller 177 as more clearly shown in Fig. 11.

The pin and roller 177, like the pin 72 as described in connection with Figs. 6 and 7, is arranged with its axis parallel the axis of the lever pivot pin 161 but it is slightly offset laterally from that plane which includes the drum and lever pivot axes. Thus changes in the effective length of the short arm of the lever are minimized during lever movement as the pin and roller 177 actuates one or the other of the operating ends 157, 158 of the brake shoes 152, 153.

To prevent substantial rotation of the electromagnet 169 on and with respect to the lever arm 174, a U-shaped member 180 is affixed to the cylindrical casing of the electromagnet 169 with the arms 181, 182 extending to either side of the lever arm 174. The respective dimensions of the lever arm 174 and the U-shaped member 180 are such as to permit of free movement of the electromagnet 169 on the pin 183 both axially and in a limited universal pivotal manner while restraining substantial rotation thereof.

Electrical connections and lead wires not shown supply current to the winding of the electromagnet 169 from a source of voltage as in Fig. 12. A screw clamp 184 on the arm 174 of the lever 170 provides means for holding the lead wires (not shown) in place and preventing strain on the connections to the electromagnet winding during lever movement.

The circuit wiring diagram of Fig. 12 schematically shows a source of direct voltage 195 and electromagnet winding 196 as in the electromagnets of any of the preceding drawings, and a rheostat 197. The voltage source may be a storage battery, such as the six-volt conventional batteries employed on automobiles, trucks, or motorcycles. The rheostat is preferably one which may be operated by hand lever or foot pedal to controllably vary the energization of the electromagnet winding from zero to maximum current at the voltage of the source.

As should be evident from the foregoing description, the invention may be embodied in many different forms other than the few typical and preferred as shown without departing from the gist of the invention as defined in the following claims.

I claim:

1. That method of deriving force from the torque of a rotating part by sliding friction controllably maintained electromagnetically between two flat surfaces which comprises arranging a compact flat-face direct-current electromagnet in continuous flat rubbing contact relation with a rotating flat-face armature, disposing the electromagnet wholly to one side of the axis of rotation of the armature at a substantial radial distance therefrom, controllably energizing the electromagnet winding from a source of direct current voltage, and applying the force exerted between the electromagnet and the rotating armature to a movable working-member non-rigidly associated with the electromagnet from within the electromagnet structure at a plane closely adjacent the said plane of rubbing contact.

2. That method of deriving force from the torque of a rotating part by sliding friction controllably maintained electromagnetically between two flat surfaces which comprises arranging a compact flat-face central-core direct-current electromagnet in continuous flat rubbing contact relation with a rotating flat-face armature, disposing the electromagnet wholly to one side of the axis of rotation of the armature at a substantial radial distance therefrom, controllably energizing the electromagnet winding from a source of direct current voltage, and applying the force exerted between the electromagnet and the rotating armature to a movable working-member non-rigidly associated with the electromagnet from within the central core of the electromagnet structure at a plane closely adjacent the said plane of rubbing contact.

3. That method of deriving force from the torque of a rotating part by sliding friction controllably maintained electromagnetically between two flat surfaces which comprises arranging a compact flat-face central-core direct-current electromagnet in continuous flat rubbing contact relation with a rotating flat-face armature, disposing the electromagnet wholly to one side of the axis of rotation of the armature at a substantial radial distance from said axis, controllably energizing the electromagnet winding from a source of direct current voltage, and applying the force exerted between the electromagnet and the rotating armature to a movable working member through a connection permitting of axial and limited universal pivotal movement of the electromagnet from within the central portion of the electromagnet at a plane closely adjacent the said plane of rubbing contact.

4. That method of deriving force from the torque of a rotating part by sliding friction controllably maintained electromagnetically between two flat surfaces which comprises arranging a compact iron-clad flat-face direct-current electromagnet in continuous flat rubbing contact relation with a rotating flat-face armature, disposing the electromagnet wholly to one side of the axis of rotation of the armature at a substantial distance therefrom, controllably energizing the electromagnet winding from a source of direct current voltage, and applying the force exerted between the electromagnet and the rotating armature to the long arm of a lever from within the electromagnet at a plane closely adjacent to the said plane of rubbing contact.

5. That method of deriving force from the torque of a rotating part by sliding friction controllably maintained electromagnetically between two flat surfaces which comprises arranging a compact iron-clad flat-face central-core direct-current electromagnet in continuous flat rubbing contact relation with a rotating flat-face armature, disposing the electromagnet wholly to one side of the axis of rotation of the armature at a substantial distance therefrom, controllably energizing the electromagnet winding from a source of direct current voltage, and applying the force exerted between the electromagnet and the rotating armature to the long arm of a lever of the first class from within the central core of the electromagnet structure at a plane closely adjacent to the said plane of rubbing contact.

6. In mechanism for controllably deriving force from the torque of a rotating part by electromagnetically induced sliding friction, the combination of a flat-face armature adapted to be rotated about an axis, a non-rotatable support arranged adjacent said armature, a working member arranged on said support and adapted to be moved relative to the support, a compact flat-face direct-current electromagnet non-rigidly mounted on said working member with its face wholly disposed to one side of said axis at a substantial radial distance therefrom and in continuous flat rubbing contact relation with said armature, said electromagnet being supported by said working member from within the electromagnet structure at a plane closely adjacent the plane of said rubbing contact, and means including a source of direct current voltage for controllably energizing the winding of the electromagnet.

7. In mechanism for controllably deriving force from the torque of a rotating part by electromagnetically induced sliding friction, the combination of a flat-face armature adapted to be rotated about an axis, a non-rotatable support arranged adjacent said armature, a working member arranged on said support and adapted to be moved relative to the support, a compact flat-face central-core direct-current electromagnet non-rigidly mounted on said working member with its face wholly disposed to one side of said axis at a substantial radial distance therefrom and in continuous flat rubbing contact relation with said armature, said electromagnet being supported by said working member from within the central core thereof at a plane closely adjacent the plane of said rubbing contact, and means including a source of direct current voltage for controllably energizing the winding of the electromagnet.

8. In mechanism for controllably deriving force by electromagnetically induced sliding friction between two relatively moving flat surfaces in rubbing contact relation comprising the combination of a compact flat-face central-core direct-current electromagnet, a movable working member, and means for non-rigidly supporting said electromagnet on said working member from within the central core of the electromagnet at a plane closely adjacent the face thereof to permit of axial and limited universal pivotal movement of the electromagnet with respect to the working member.

9. In mechanism for controllably deriving force by electromagnetically induced sliding friction between two relatively moving flat surfaces in rubbing contact relation comprising the combination of a compact flat-face electromagnet, a pivoted lever, and means for non-rigidly supporting said electromagnet adjacent the end of an arm of said lever from within the electromagnet structure at a plane closely adjacent the flat face thereof to permit of axial and limited universal pivotal movement of the electromagnet with respect to the lever arm.

10. In mechanism for controllably deriving force by electromagnetically induced sliding friction between two relatively moving flat surfaces in rubbing contact relation comprising the combination of an iron-clad flat-face central-core electromagnet, a pivoted lever, and means for non-rigidly supporting said electromagnet adjacent the end of an arm of said lever from within the central core of the electromagnet at a plane closely adjacent the flat face thereof to permit of axial and limited universal pivotal movement of the electromagnet with respect to the lever arm.

11. In mechanism for controllably deriving force by electromagnetically induced sliding friction between two relatively moving flat surfaces in rubbing contact relation comprising the combination of a flat-face central-core electromagnet having a circular axial opening in the central core thereof, a movable working member, and means for non-rigidly supporting said electromagnet on said working member from within said central core opening at a plane closely adjacent the face thereof to permit of limited universal pivotal movement of the electromagnet with respect to the working member.

12. In mechanism for controllably deriving force by electromagnetically induced sliding friction between two relatively moving flat surfaces in rubbing contact relation comprising the combination of an iron-clad flat-face central-core electromagnet having a circular axial opening in said central core, a lever, and means for supporting said electromagnet on said lever from within said central core opening at a plane closely adjacent the flat face thereof to permit of limited universal pivotal movement of the electromagnet with respect to the said lever arm.

13. In mechanism for controllably deriving force by electromagnetically induced sliding friction between two relatively moving flat surfaces in rubbing contact relation comprising the combination of a disc-like flat-face armature adapted to be rotated about an axis, a lever, a symmetrical iron-clad central-core flat-face direct-current electromagnet having a circular axial opening in said central core, means for supporting said electromagnet on said lever from within said central-core opening at a plane closely adjacent the flat face of the electromagnet to permit of limited axial and universal pivotal movement to accommodate slight irregularities of armature movement during rotation thereof, and means including a source of direct current voltage for controllably energizing the electromagnet winding.

14. In an electromagnetically actuated brake, a drum having an upright web, a non-rotatable support disposed adjacent said drum, a brake shoe and an anchor therefor carried by said support, and means for applying said brake comprising a lever, a pivot pin fixed on said support within said drum and about which pin said lever is pivoted, a flat-face armature within said drum adapted to be rotated with said drum about the drum axis, a compact flat-face direct-current electromagnet wholly supported by said lever at a point more than 90° from the point of pivotal connection of said lever on said support, said electromagnet being non-rigidly supported on said lever to permit of both axial and limited universal pivotal movement and with the electromagnet face in continuous flat rubbing contact relation with said armature, and means including a source of direct current voltage for controllably energizing the winding of said electromagnet.

15. In an electromagnetically actuated brake, a drum having an upright web, a non-rotatable support disposed adjacent said drum, a brake shoe and anchor means therefor carried by said support, and means for applying said brake comprising a lever, a pivot pin fixed on said support within said drum and about which pin said lever is pivoted, a circular disc-like armature within said drum fixedly related to said web and adapted to be rotated with said drum about the drum axis, a compact circular iron-clad central-core flat-face direct-current electromagnet having a circular axial opening in the central core thereof wholly supported by said lever at a point more than 90° from the point of pivotal connection of said lever on said non-rotatable support, said electromagnet being non-rigidly arranged on said lever to permit of both limited axial and universal pivotal movement and with the electromagnet face in continuous flat rubbing contact relation with said armature, and means including a source of direct current voltage for controllably energizing the winding of said electromagnet.

16. In an electromagnetically actuated brake, the combination of a drum rotatable about its axis and having a flange portion and an upright web portion, a non-rotatable support, an anchor member carried by said support, an expansible friction member having separable operating ends between which the said anchor is arranged, spring means for retracting the friction member during normal brake release, with means for controllably applying the brake comprising a ferromagnetic armature element presenting an upright flat working face associated with said drum and web and adapted to rotate therewith, a lever of the first class having its short arm and pivot interposed between the separable operating ends of the said friction member and its relatively long arm curvedly extending from the pivot around and beyond the drum axis to a point substantially diametrically opposite the pivot, an auxiliary brake member including an iron-clad central-core flat-face electromagnet supported by said lever long arm at the end portion thereof, said electromagnet being so mounted on said lever arm as to permit of limited universal pivotal movement thereof with respect to said lever arm, and with its flat working face toward the drum web in continuous flat rubbing contact with the flat face of said armature despite slight irregularities of movement of the armature during rotation of the drum.

17. In an electromagnetically controlled brake, the combination of a drum rotatable about its axis and having a flange and a web portion, an expansible friction member having separable operating ends, a non-rotatable support, an anchor member carried by said support and disposed between the separable operating ends of said friction member, with means for controllably and variably applying the brake comprising a flat-face armature element of ferromagnetic material rotatable with said drum and adapted to present a continuous annular flat working face perpendicular to the drum axis within the under-flange portion of the drum, a lever of the first class having its short arm and pivot interposed between the separable operating ends of said friction member, and its relatively long arm curvedly extending from the pivot to a point around and beyond the drum axis substantially drum-diametrically opposite the axis of the pivot, said lever pivot being integral with said anchor member, an auxiliary brake member including a circular iron-clad central-core flat-face electromagnet wholly supported by said lever long arm at the end portion thereof, said electromagnet being non-rigidly mounted on the lever long arm as to present its working face normally perpendicular to the drum axis in continuous flat rubbing contact with the flat face of said armature element, but to permit of axial and limited universal pivotal movement of the electromagnet working face to maintain said contact despite slight irregularities of movement of the armature in rotation with the drum.

18. In a momentum self-energizing vehicle brake wherein the primary force applied to operate the brake is derived from the torque of a rotating part at a wheel, the combination of a drum rotatable about the wheel axis and having a flange portion and a web portion, a non-rotatable support, an expansible friction member within said drum having separable operating ends and adapted to be expanded into frictional braking engagement with said drum flange, an anchor carried by said support extending between the separable operating ends of the said expansible friction member and adapted to provide a hanger for said member when in retracted position, with means for controllably applying the said expansible friction member in frictional engagement with said drum flange, comprising a lever of the first class pivoted at the anchor, with its short arm arranged to actuate the separable operating ends of the expansible friction member, and its long arm extending from its pivot arcuately around and beyond the wheel axis to a point substantially drum-diametrically opposite the pivot, and means wholly supported by the lever at the free end portion of the long arm adapted to apply a force derived frictionally from the torque of said drum in rotation to either operating end of the expansible member through the lever short arm with the advantage of the lever-arm-ratio, irrespective of the direction of drum rotation.

19. In brake mechanism wherein the actuating force is controllably derived from the torque of a rotating part by electromagnetically induced friction, the combination of a drum rotatable about its axis and having a flange portion, a non-rotatable support fixedly disposed adjacent said drum, friction member means and anchor means therefor carried on said support, with means for moving said friction member means into braking engagement with the drum flange comprising a lever of the first class having a long arm extending around and beyond the axis of rotation of said drum and a short arm adapted to actuate said friction member means, a pivot pin fixedly arranged on said support with its axis parallel to said drum axis and disposed in a plane which includes both the drum axis and a diameter of said drum, and about which pin said lever is pivoted, and a circular pin fixedly arranged on said lever short arm adjacent the end thereof with its axis disposed parallel said pivot pin and drum axes and in a separate plane closely adjacent and parallel said first, said pin being adapted to operatively engage said friction member means, a flat-face armature arranged within said drum adapted to rotate perpendicularly about the drum axis in fixed relation with said drum, and a compact iron-clad central-core flat-face direct current electromagnet arranged adjacent the free end of the long arm of said lever and wholly supported thereby in flat rubbing contact relation with said armature, and means including a source of direct current voltage for controllably energizing the winding of said electromagnet, whereby changes in the effective length of the short arm of the lever are minimized during electromagnetically induced lever movement about said pivot.

20. In mechanism for controllably deriving force by electromagnetically induced sliding friction between two relatively moving flat surfaces in rubbing contact relation, comprising the combination of a disc-like flat-face armature adapted to be rotated about an axis, a lever, and an iron-clad central-core flat-face direct current electromagnet, said electromagnet being wholly supported by said lever upon an arm thereof, spring means arranged between said lever arm and the electromagnet adapted to urge and maintain said electromagnet in normal light rubbing flat contact relation with said rotating armature in the absence of electromagnetic attraction therebetween, and means associated with both said electromagnet and lever arm for preventing substantial rotation of the electromagnet with respect to said lever arm when the electromagnet winding is energized to produce electromagnetic attraction between the electromagnet and said armature.

21. In mechanism for controllably deriving force by electromagnetically induced sliding friction between two relatively moving flat surfaces in rubbing contact relation, comprising the combination of a disc-like flat-face armature adapted to be rotated about an axis, a lever, and an iron-clad central-core flat-face direct current electromagnet, said electromagnet being pivotally supported upon an arm of said lever, spring means arranged on said lever arm adapted to yieldingly urge and maintain said electromagnet in normal light rubbing flat contact relation with said rotating armature in the absence of electromagnetic attraction therebetween, and a member affixed to the casing of the electromagnet and which engages the lever arm for preventing substantial rotation of said electromagnet about its pivot while permitting of axial and limited pivotal movement thereof when the electromagnet winding is energized to produce electromagnetic attraction between the electromagnet and said armature.

WILLIAM F. PENROSE.